(12) United States Patent
Duggal et al.

(10) Patent No.: US 8,779,726 B2
(45) Date of Patent: Jul. 15, 2014

(54) CONTROL SYSTEM AND METHOD FOR CHARGING SEALED BATTERIES

(75) Inventors: Anil Raj Duggal, Niskayuna, NY (US); Herman Lucas Norbert Wiegman, Niskayuna, NY (US); Gregory John Parker, Latham, NY (US)

(73) Assignee: General Electric Company, Niskayuna, NY (US)

( * ) Notice: Subject to any disclaimer, the term of this patent is extended or adjusted under 35 U.S.C. 154(b) by 895 days.

(21) Appl. No.: 12/727,536

(22) Filed: Mar. 19, 2010

(65) Prior Publication Data

US 2011/0227541 A1 Sep. 22, 2011

(51) Int. Cl.
*H02J 7/00* (2006.01)
(52) U.S. Cl.
USPC .......................................... 320/137; 429/164
(58) Field of Classification Search
USPC ........................................................ 320/137
See application file for complete search history.

(56) References Cited

U.S. PATENT DOCUMENTS

| 4,767,684 | A | * | 8/1988 | Halbach | 429/103 |
| 6,958,197 | B2 | | 10/2005 | Tamakoshi | |
| 2002/0187372 | A1 | * | 12/2002 | Hall et al. | 429/7 |
| 2004/0058235 | A1 | * | 3/2004 | Huang et al. | 429/164 |
| 2008/0050646 | A1 | * | 2/2008 | Winter | 429/61 |

FOREIGN PATENT DOCUMENTS

WO WO 98/31065 A1 7/1998

* cited by examiner

*Primary Examiner* — Edward Tso
*Assistant Examiner* — Robert Grant
(74) *Attorney, Agent, or Firm* — Francis T. Coppa

(57) ABSTRACT

A passive battery charging control system for charging a battery is devoid of active electrical components. The passive battery charging control system includes one or more passive electrical control elements configured to limit the charging state of the battery.

15 Claims, 3 Drawing Sheets

CONTROL SYSTEM AND METHOD FOR CHARGING SEALED BATTERIES

BACKGROUND

This invention relates generally to sealed batteries, and more particularly to a system and method for safely charging sealed batteries such as sodium/metal chloride batteries.

Sodium chloride (NaCl) in the cathode of a sodium/metal chloride battery is converted into sodium (Na) ions and M-Cl complex through a series of chemical and transport steps during charging of a sodium/metal chloride battery. The Na ions are transported out of the cathode through a solid ion-conducting electrolyte into the anode compartment. The corresponding anode volume must be large enough to accommodate complete charging of the cathode. The total anode volume is typically about 0.42 times the total cathode volume for typical cathode configurations. If the anode volume is less, the liquid Na will pressurize the anode and could cause failure of either the solid electrolyte or anode compartment.

Although techniques are known for avoiding overcharging in the anode compartment of a sodium/metal chloride battery, these known techniques generally rely on the use of active circuit elements that add cost and reduce the reliability of a corresponding charging control system.

In view of the foregoing, it would be advantageous to provide a system and method for preventing overcharging (too much Na) in the anode compartment of a sodium/metal chloride battery in a manner that is more cost effective and achieve higher reliability than techniques that employ active circuit elements. It would be beneficial if the system and method could be successfully applied to any sealed battery having a variable fluid level anode compartment.

BRIEF DESCRIPTION

According to one embodiment, a passive battery charging control system devoid of active electrical control elements for charging a battery comprises:

an anode compartment comprising an anode fluid sealed therein;

a first anode current collector configured to physically remain in contact with the anode fluid during operation of the battery;

a second anode current collector configured to physically contact the anode fluid only when the anode fluid reaches a desired maximum level within the anode compartment during the operation of the battery; and a passive control element configured to limit the charging state of the battery when the second anode current collector makes physical contact with the anode fluid during operation of the battery, wherein the passive battery charging control system is free of active electrical components.

According to another embodiment, a passive battery charging control system devoid of active electrical control elements for charging a battery comprises one or more passive electrical control elements configured to limit the charging state of the battery.

According to yet another embodiment, a passive battery charging control system devoid of active electrical control elements for charging a battery comprises:

an anode compartment comprising an anode fluid sealed therein;

a plurality of current collectors; and a passive control element, the plurality of current collectors and the passive control element together configured to limit the charging state of the battery when the anode fluid reaches a desired maximum level within the anode compartment, wherein the passive battery charging control system is free of active electrical components.

DRAWINGS

These and other features, aspects, and advantages of the present invention will become better understood when the following detailed description is read with reference to the accompanying drawing, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
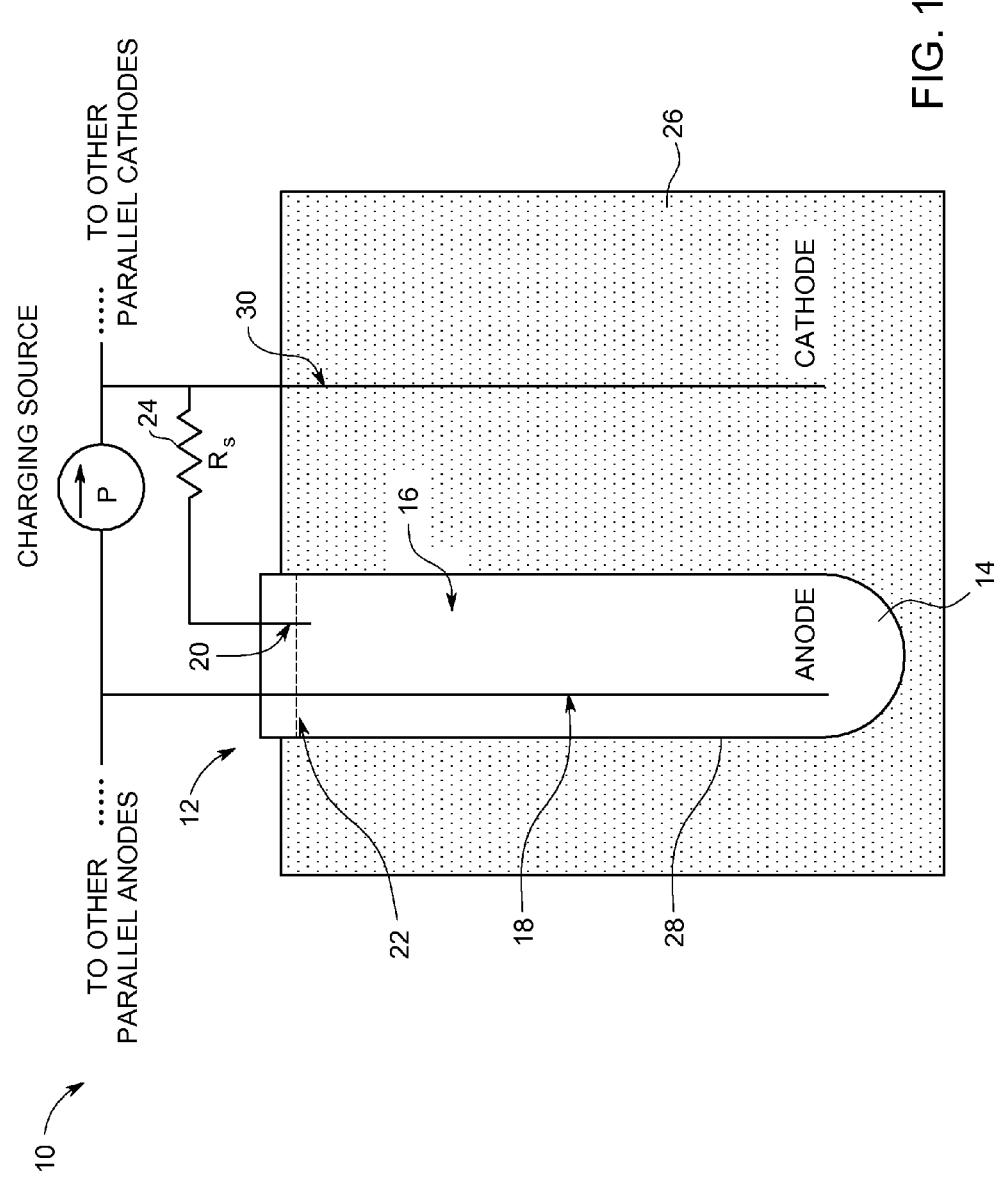
FIG. 1 is a simplified schematic diagram illustrating a control system for charging a battery cell according to one embodiment.

FIG. 1 illustrates a control system 10 for charging a battery cell 12 according to one embodiment. Battery cell 12 comprises an anode compartment 14. Anodic material 16 in fluidized form is sealed within anode compartment 14.

A first anode current collector 18 is configured to physically remain in contact with the anodic material 16 during operation of the battery cell 12, such as during charging and discharging of the battery cell 12. A second anode current collector 20 is configured to physically contact the anodic material 16 only when the anodic material reaches a desired maximum level 22 within the anode compartment 14 during the operation of the battery cell.

A passive control element 24, such as without limitation, a high temperature resistor, is configured to limit the charging state of the battery cell 12 when the second anode current collector 20 makes physical contact with the anodic material 16 during operation of the battery cell 12. During charging of some batteries such as, for example, a sodium/metal chloride battery, sodium chloride (NaCl) in the cathode 26 through a series of chemical and transport steps, is converted into sodium (Na) ions and metal-chloride (M-Cl) complex. The Na ions are transported out of the cathode 26 through a solid ion-conducting electrolyte 28 into the anode compartment 14. The anode compartment volume must be large enough to accommodate the complete charging of the cathode 26. The anode compartment volume is typically about 0.42 times the cathode volume for typical sodium/metal chloride battery cathode configurations. If the anode compartment volume is less, then the anodic material 16 such as Na will pressurize the anode compartment 14 beyond its physical limitations, causing failure of either the solid electrolyte 28 or anode compartment 16.

With continued reference to FIG. 1, the first anode current collector 18 extends downward through the height of the anode compartment 14 to maintain physical contact with the varying anodic material 16, e.g. liquid Na, level during operation of the battery cell 12. The second anode current collector 20, e.g. wire, is also extended into the anode compartment 14.

Second anode current collector 20 however extends only down to approximately a desired maximum level 22 of anodic material, e.g. Na. The opposite end of the second anode current collector 20 is connected to a passive control element 24, such as without limitation, a shorting resistor Rs. The passive element 24 is also electrically connected to a corresponding cathode current collector 30 such as depicted in FIG. 1.

The final state of charge of the cell 12, and any cells in parallel with the cell 12 can be controlled in response to the physical extension of the second anode current collector 20, the value of the passive element 24, e.g. resistance, and the resistance of the battery cell 12, which depends upon the state of charge of the battery cell 12.

Figure 3:
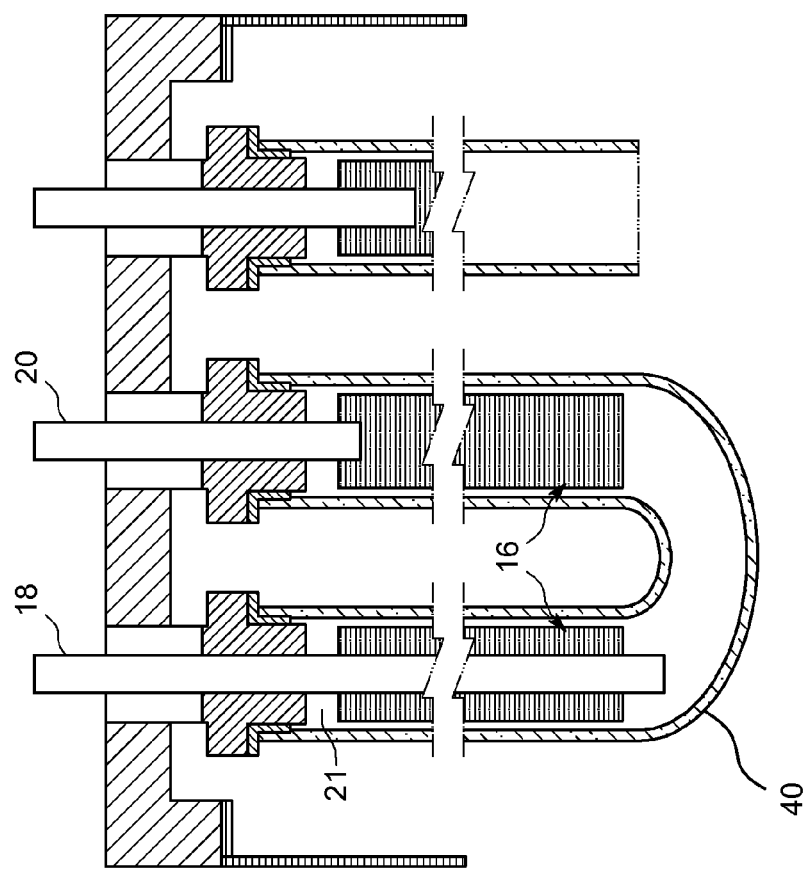
FIG. 3 is a cross-sectional view of an anode tube assembly according to one embodiment.

Although the first and second anode current collectors 18, 20 may be implemented using a pair of distinct and separate current conductors, e.g. wires, another embodiment may use a structure such as a coaxial cable to implement the current collector pair 18, 20. In this embodiment, the inner coaxial cable conductor can be used to form one of the current collectors such as current collector 18, while the outer electrical shield can be used to form the other current collector such as current collector 20. Another embodiment employs a U-shaped anode tube 40 such as depicted in FIG. 3. In this embodiment, the anodic material 16 naturally equalizes to the same level in each side of the U-shaped anode tube 40 during operation of the battery cell. The first anode current collector 18 is inserted into one side of the U-shaped anode tube 40, while the second, shorter anode current collector 20 that connects with the passive element 24 shown in FIG. 1, is inserted into the other side of the U-shaped anode tube 40 such as depicted in FIG. 3. The foregoing coaxial cable and U-shaped anode tube embodiments are particularly useful when the corresponding anode tube structure cross-sectional area when viewed in the axial direction of the anode tube is too small to insert two workable separate and distinct anode current collectors such as two separate and distinct wire elements.

According to one embodiment, the passive element 24 may be a typical high temperature resistor and may have a resistance value that ranges between zero or no resistance and up to an upper limit that is based upon and depends upon the value of battery cell resistance between the cathode current collector 30 and the first anode current collector 18 such as depicted in FIG. 1.

Figure 2:
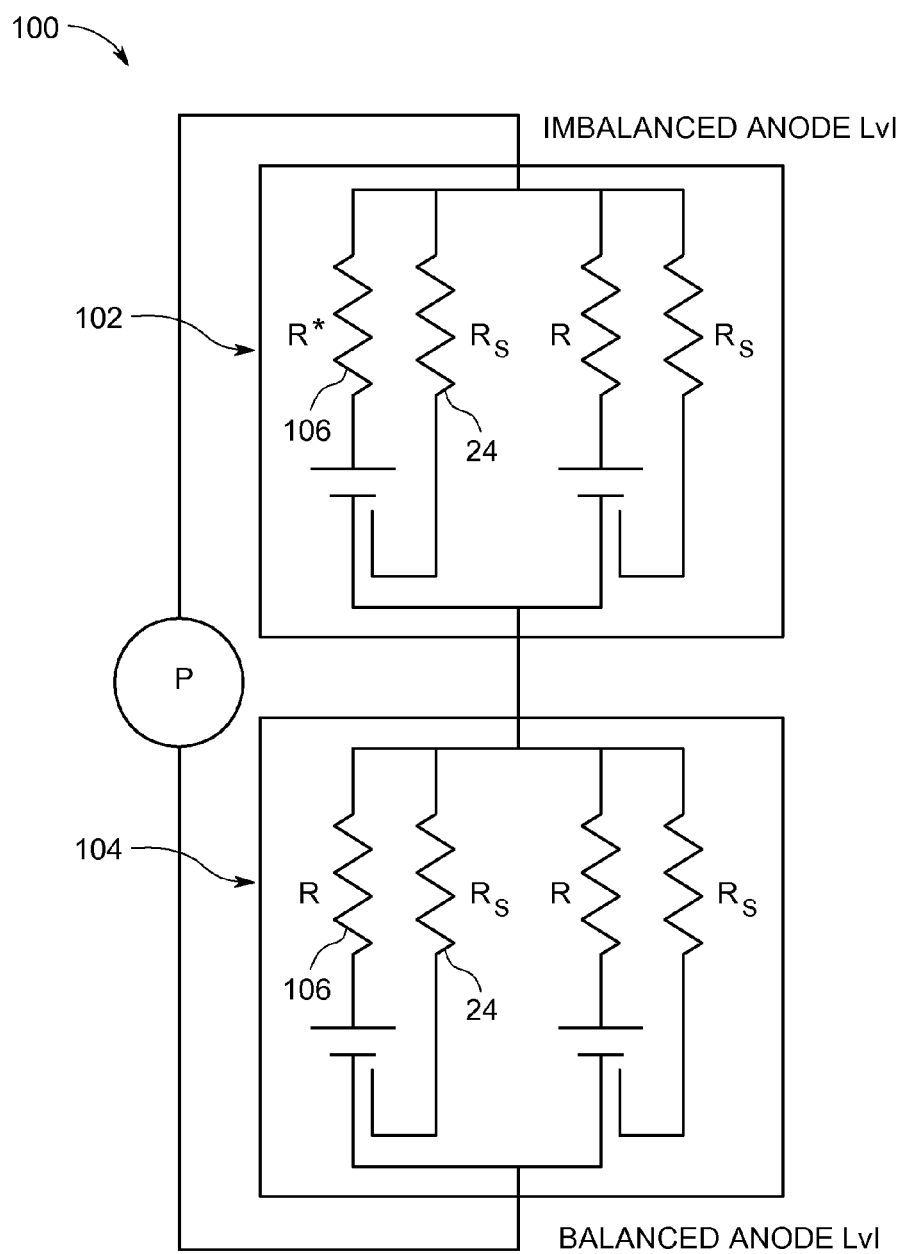
FIG. 2 is a schematic diagram illustrating a control system for charging a plurality of battery cells according to one embodiment.

FIG. 2 is a schematic diagram illustrating a control system 100 for charging a plurality of battery cells 102, 104 according to one embodiment. Each battery cell 102, 104 may be implemented as shown in FIG. 1 described herein.

A workable range of resistance values can be defined for passive element 24 using the simplified model shown in FIG. 2. A battery comprises a collection of one or more (Ns) cells, e.g. 102, 104, in series. Each cell Ns has a common cathode and one or more (Np) anodes. The workable range of resistance value for passive element 24 can be defined as follows:

$$Voc/I < Rs < Voc*Np/I,$$

where Rs is the resistance of passive element 24, I=maximum recharge current used for charging, and Voc is the open circuit voltage, which depends on the chemistry of the cell, e.g. 102, 104. Resistance values smaller than the lower bound Voc/I allows other (parallel) anodes in the cell to discharge through the shorted anode(s). This condition also provides a workable solution though less charge is stored in the corresponding cell than the cell is capable of storing. Resistance values larger than the upper bound Voc*Np/I results in a condition that all anode cells will continue to charge (and potentially completely fill) even after all anodes are shorted. In between these two limits, any anode cell that is shorted will continue to charge until all anode cells become shorted, at which time the cell will be charged and no anode will be further filled. The expected variation of the resistance for each anode determines the distance of the second electrode 20 into the anode chamber and the value of Rs so that no anode can completely fill. A completely filled anode may lead to failure of that anode (and therefore the failure of that cell). If a cell, e.g. 102, 104, fails, the corresponding battery itself may still work; but now the battery comprises Ns−1 working cells in series.

The maximum recharge current I, is determined by chemical aspects (e.g. too much current can be harmful to the battery), or is based upon the allowable current density through the solid electrolyte 28 (i.e. I<Jmax*Aanode, where Jmax is the maximum allowable current density in the solid electrolyte 28 and Aanode is the total working surface area of all the anodes in a cell. A subcell resistance 106 can be defined by Voc*Np/I described herein; the resistance of the entire cell, e.g. 102 or 104, can be defined by Voc/I described herein.

Although particular embodiments described with reference to FIG. 2 depict a plurality of passive elements 24, other embodiments can just as easily employ a single passive element 24 to achieve the desired results using the principles described herein. In one such embodiment, a single passive control element 24 such as a typical high temperature resistor can be electrically connected at one end to a common battery cathode, while the other end of the resistor can be connected to a plurality of anode current collectors 20. Generally the use of a high temperature resistor is only needed for high temperature applications, sometimes greater than about 125° C., such as when using Na/M-Cl batteries, since they operate at high temperatures.

While the invention has been described in terms of various specific embodiments, those skilled in the art will recognize that the invention can be practiced with modification within the spirit and scope of the claims.

What is claimed is:

1. A passive battery charging control system devoid of active electrical control elements for charging a battery that comprises an anode fluid contained in an anode compartment, wherein the passive battery charging control system comprises one or more passive electrical control elements configured to limit the charging state of the battery; and wherein the level of anode fluid during operation of the battery is limited by at least one of the control elements; and wherein the control system further comprises a plurality of current collectors, wherein the current collectors and the one or more passive electrical control elements together are configured to limit the charging state of the battery only when the anode fluid reaches a desired maximum level within a corresponding anode compartment; and wherein at least two current collectors are integrated with a U-shaped anode tube.

2. The control system according to claim 1, wherein the plurality of current collectors comprises at least one cathode current collector and a plurality of anode current collectors.

3. The control system according to claim 1, wherein the plurality of current collectors comprises a coaxial cable configured to provide a pair of anode current collectors.

4. The control system according to claim 1, wherein at least one passive electrical control element comprises a resistor.

5. A passive battery charging control system devoid of active electrical control elements for charging a battery, the control system comprising:

an anode compartment comprising an anode fluid sealed therein;

a plurality of current collectors; and a passive control element, the plurality of current collectors and the passive control element together configured to limit the charging state of the battery when the anode fluid reaches a desired maximum level within the anode compartment, wherein the passive battery charging control system is free of active electrical components;

wherein at least two of the current collectors are integrated with a U-shaped anode tube.

6. The control system according to claim 5, wherein the anode fluid comprises sodium.

7. The control system according to claim 5, wherein the passive control element comprises a resistor.

8. The control system according to claim 5, wherein the anode fluid level during operation of the battery is limited by the passive electrical control element.

9. The control system according to claim 5, wherein the plurality of current collectors comprises a coaxial cable configured to provide a pair of anode current collectors.

10. The control system according to claim 5, wherein the plurality of current collectors comprises at least one cathode current collector and a plurality of anode current collectors.

11. A passive battery charging control system devoid of active electrical control elements for charging a battery, the control system comprising:

an anode compartment comprising an anode fluid sealed therein;

a first anode current collector configured to physically remain in contact with the anode fluid during operation of the battery;

a second anode current collector configured to physically contact the anode fluid only when the anode fluid reaches a desired maximum level within the anode compartment during the operation of the battery; and a passive control element configured to limit the charging state of the battery when the second anode current collector makes physical contact with the anode fluid during operation of the battery, wherein the passive battery charging control system is free of active electrical components;

wherein the anode fluid level during operation of the battery is limited by the passive electrical control element, and by a length of the second anode current collector sealed within the anode compartment.

12. The control system according to claim 11, wherein the anode fluid comprises sodium.

13. The control system according to claim 11, wherein the passive control element comprises a resistor.

14. The control system according to claim 11, wherein the first anode current collector and the second anode current collector comprise a coaxial cable configured to provide a pair of anode current collectors.

15. A passive battery charging control system devoid of active electrical control elements for charging a battery, the control system comprising:

an anode compartment comprising an anode fluid sealed therein;

a first anode current collector configured to physically remain in contact with the anode fluid during operation of the battery;

a second anode current collector configured to physically contact the anode fluid only when the anode fluid reaches a desired maximum level within the anode compartment during the operation of the battery; and a passive control element configured to limit the charging state of the battery when the second anode current collector makes physical contact with the anode fluid during operation of the battery, wherein the passive battery charging control system is free of active electrical components; and wherein the anode compartment is configured as a U-shaped compartment, wherein the first anode current collector is at least partially sealed to one end of the U-shaped compartment, and further, wherein the second anode current collector is at least partially sealed to the opposite end of the U-shaped compartment.

* * * * *